US012678710B2

(12) United States Patent
Sugahara

(10) Patent No.: US 12,678,710 B2
(45) Date of Patent: Jul. 14, 2026

(54) LIQUID-LIQUID EXTRACTION UNIT AND MULTISTAGE LIQUID-LIQUID EXTRACTION APPARATUS USING THE SAME

(71) Applicant: Shin-Etsu Chemical Co., Ltd., Tokyo (JP)

(72) Inventor: Hiroto Sugahara, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 643 days.

(21) Appl. No.: 17/691,333

(22) Filed: Mar. 10, 2022

(65) Prior Publication Data

US 2022/0305404 A1 Sep. 29, 2022

(30) Foreign Application Priority Data

Mar. 24, 2021 (JP) ................................. 2021-049326

(51) Int. Cl.
*B01D 11/04* (2006.01)
*B01D 11/00* (2006.01)

(52) U.S. Cl.
CPC .... *B01D 11/0473* (2013.01); *B01D 2011/005* (2013.01)

(58) Field of Classification Search
None
See application file for complete search history.

(56) References Cited

U.S. PATENT DOCUMENTS

| | | | |
|---|---|---|---|
| 3,479,378 A | 11/1969 | Orlandini et al. | |
| 3,663,178 A | 5/1972 | Miller et al. | |
| 4,844,801 A | 7/1989 | Szanto | |
| 2013/0183208 A1 | 7/2013 | Sugahara et al. | |
| 2016/0281007 A1* | 9/2016 | Reams ..................... | C07C 29/86 |
| 2016/0304986 A1 | 10/2016 | Sugahara et al. | |
| 2018/0119031 A1* | 5/2018 | Haworth ............ | B01D 11/0484 |

FOREIGN PATENT DOCUMENTS

| | | | | |
|---|---|---|---|---|
| CN | 103203120 A | * | 7/2013 | ............. B01D 11/04 |
| CN | 111514611 A | * | 8/2020 | |
| DE | 1080522 B | | 4/1960 | |
| EP | 0252785 A1 | | 1/1988 | |
| EP | 2614868 A1 | | 7/2013 | |
| JP | 2008-289975 A | | 12/2008 | |
| JP | 2013-144270 A | | 7/2013 | |
| JP | 2018-99691 A | | 6/2018 | |

OTHER PUBLICATIONS

The Extended European Search Report dated Aug. 16, 2022, issued in counterpart EP Application No. 22162662.5. (8 pages).

* cited by examiner

*Primary Examiner* — Ryan B Huang
(74) *Attorney, Agent, or Firm* — WHDA, LLP

(57) ABSTRACT

A liquid-liquid extraction unit includes a feed compartment for receiving an aqueous phase and an organic phase, mixing feeder such as a pump for mixing the aqueous and organic phases and conveying the mixture under pressure to a reaction compartment where the mixture is subjected to an extractive reaction, and a resting compartment for separating the mixture back into an aqueous phase and an organic phase and from which each phase is recovered.

5 Claims, 3 Drawing Sheets

FIG.1

LIQUID-LIQUID EXTRACTION UNIT AND MULTISTAGE LIQUID-LIQUID EXTRACTION APPARATUS USING THE SAME

CROSS-REFERENCE TO RELATED APPLICATION

This non-provisional application claims priority under 35 U.S.C. § 119(a) on Patent Application No. 2021-049326 filed in Japan on Mar. 24, 2021, the entire contents of which are hereby incorporated by reference.

TECHNICAL FIELD

This invention relates to a liquid-liquid extraction unit for contacting an aqueous phase with an organic phase and then separating the phases and recovering a desired extract from the separated aqueous phase and/or organic phase. The invention relates more particularly to a liquid-liquid extraction unit and a multistage continuous extraction apparatus suitable for the extraction and separation of rare-earth elements.

BACKGROUND ART

Rare-earth magnets are functional materials that are necessary and indispensable to the push for greater energy savings and higher functionality. The range of applications for rare-earth magnets is broad, extending from general consumer appliances such as air conditioners to automotive applications such as hybrid electric vehicles and electric vehicles, and the production volume has been growing year by year.

Rare-earth elements typically used in rare-earth magnets include cerium (Ce), praseodymium (Pr), neodymium (Nd), samarium (Sm), terbium (Tb) and dysprosium (Dy). Known methods for separating these rare-earth elements include the ion-exchange resin (or solid-liquid extraction) method and the solvent extraction (or liquid-liquid extraction) method. The solvent extraction method is commonly used in the industrial separation and purification of rare-earth elements because it is capable of efficient large-scale treatment through a continuous process.

In solvent extraction, an aqueous phase consisting of an aqueous solution containing metallic elements to be separated is contacted with an organic phase consisting of an extractant for extracting a metallic element of interest and an organic solvent for diluting the extractant, causing the metallic element of interest to be extracted with the extractant into the organic phase and thereby separated.

One apparatus widely used in solvent extraction is the so-called mixer-settler which, while continuously admitting an aqueous phase and an organic phase at constant flow rates, extracts an ingredient within the aqueous phase to the organic phase. This apparatus has a mixer section which uses an agitator to mix together the two phases and a settler section for to carrying out separation through a difference in specific gravity between the two mixed phases.

Patent Document 1 discloses a liquid-liquid extraction unit in which, when liquid-liquid extraction is carried out by introducing an aqueous phase and an organic phase into a tank, bringing the phases into contact, separating the phases and then recovering a desired extract from the separated aqueous phase and/or organic phase, the aqueous phase is admitted in a foamy (or fine droplet) state from an upper portion of the tank and the organic phase is admitted in a foamy (or fine droplet) state from a lower portion of the tank, the organic phase moving from the lower to the upper portion of the tank is contacted with the aqueous phase moving from the upper to the lower portion of the tank, transferring the desired substance between the aqueous and organic phases, the organic phase is discharged from the upper portion of the liquid tank, the aqueous phase is discharged from the lower portion of the tank, and the desired extract is recovered from the organic phase and/or the aqueous phase. In this extraction unit, when the aqueous phase and the organic phase vertically exchange places upward and downward in their foamy (or fine droplet) states, they come into effective contact with each other, enabling extraction to be carried out effectively through interfacial reactions and also enabling phase separation to proceed at the same time. This eliminates the need for an agitator and a large-volume settler chamber, making it possible to reduce the size of the apparatus.

Patent Documents 2 and 3 describe a technique called the emulsion flow process which mixes together and emulsifies two liquid phases by pump fluid delivery alone without resorting to the use of external mechanical forces such as stirring and shaking, and which utilizes metered fluid delivery by pump to rapidly separate the two emulsified liquid phases without waiting for gravitational separation or relying on external mechanical forces such as centrifugal forces. This apparatus has a very simple construction and can be easily operated.

However, in mixer-settlers, when mixing is carried out with an agitator, phase separation is poor. Therefore, as shown in FIG. 3, for example, four settler sections are needed to carry out phase separation in a mixer-settler having a single mixer section equipped with an agitator, undesirably increasing the size of the equipment. Particularly when metals having small separation factor are to be separated, the number of mixer-settler stages joined together rises, leading to such problems as an increase in the size of the system and higher costs for extractants, a building to house the system, chemicals and the like.

Also, even though the extraction unit described in Patent Document 1 has a good extraction efficiency compared with mixer-settlers and the unit can be made relatively compact, separate pumps for fluid delivery are required to introduce the aqueous and organic phases. Moreover, when the liquid volumes differ, there is a risk of liquid overflowing the extraction tank and so effort must be expended in controlling the liquid volumes with the pumps.

As in Patent Document 1, the solvent extraction by emulsion flow described in Patent Documents 2 and 3 requires, during feeding of the aqueous phase and the organic phase, separate pumps for fluid delivery of the aqueous and organic phases. When there is a difference in the fluid delivery rates at this time, control of the interfacial level between the aqueous and organic phases tends to be difficult, which may lower the efficiency of treatment.

CITATION LIST

Patent Document 1: JP-A 2013-144270
Patent Document 2: JP-A 2008-289975
Patent Document 3: JP-A 2018-099691

SUMMARY OF THE INVENTION

It is therefore an object of this invention is to provide a liquid-liquid extraction unit which enables the extraction equipment to be reduced in size without sacrificing the efficiency of rare-earth element extraction and separation and for which control of the liquid volumes is easy. Another object is to provide a multistage liquid-liquid extraction apparatus that uses such a unit.

The inventor has found that by using a single pump or other pressure conveying means to simultaneously draw an aqueous phase and an organic phase that have been admitted to a feed compartment and then deliver them to a reaction compartment so as to cause mixing and extractive reaction to occur and subsequently allowing these phases to separate in a standing compartment, the unit can be easily reduced in size while maintaining a good extraction efficiency and liquid volume control of the aqueous and organic phases can be readily carried out. The invention is predicated on these findings.

The invention provides a liquid-liquid extraction unit adapted for contacting an aqueous phase with an organic phase, separating the contacted phases and recovering a desired extract from the separated aqueous phase and/or organic phase, comprising a feed compartment for receiving the aqueous phase and the organic phase, a reaction compartment divided from the feed compartment by a partition for receiving a mixture of the aqueous phase and the organic phase and subjecting the aqueous and organic phases to an extractive reaction, a standing compartment in fluid communication with the reaction compartment for separating the mixture that flows in from the reaction compartment into an aqueous phase and an organic phase, mixing feeder for drawing the aqueous phase and the organic phase from the feed compartment, mixing together the phases, and conveying the mixture under pressure to the reaction compartment, an aqueous phase suction line having a distal end disposed in a lower portion of the feed compartment and a proximal end connected to the mixing feeder for drawing the aqueous phase from the lower portion of the feed compartment to the mixing feeder, an organic phase suction line having a distal end disposed above the distal end of the aqueous phase suction line and a proximal end connected to the mixing feeder for drawing the organic phase from the feed compartment to the mixing feeder, and a mixture feeding line having a distal end disposed within the reaction compartment and a proximal end connected to the mixing feeder for feeding the mixture delivered from the mixing feeder to the reaction compartment.

The aqueous phase and the organic phase received in the feed compartment are drawn to the mixing feeder and mixed, the mixture is conveyed to the reaction compartment and there subjected to an extractive reaction, the resulting mixture is then separated into an aqueous phase and an organic phase in the standing compartment, and the phases are each recovered.

The mixing feeder is preferably a single pump.

In a preferred embodiment, a spray nozzle or a full cone nozzle is attached to the distal end of the mixture feeding line disposed in the reaction compartment for discharging the mixture in a fine droplet state. The spray nozzle or full cone nozzle preferably has an orifice diameter of between 30 μm and 10 mm.

In another preferred embodiment, the reaction compartment and the standing compartment are separated by a partition having means disposed above or in an upper to portion thereof and below or in a lower portion thereof for providing fluid communication between the reaction compartment and the standing compartment.

In yet another preferred embodiment, the feed compartment and the reaction compartment are separated by a partition having means disposed below or in a lower portion thereof for providing fluid communication between the feed compartment and the reaction compartment.

Advantageous Effects of the Invention

The liquid-liquid extraction unit of the invention facilitates control of the liquid volumes, provides good separation of the mixed aqueous and organic phases, and enables extraction equipment to be reduced in size without sacrificing performance.

BRIEF DESCRIPTION OF THE DRAWINGS

FIG. 1 is a schematic perspective view of an exemplary liquid-liquid extraction unit according to one embodiment of the invention.

DESCRIPTION OF THE EMBODIMENTS

Figure 2:
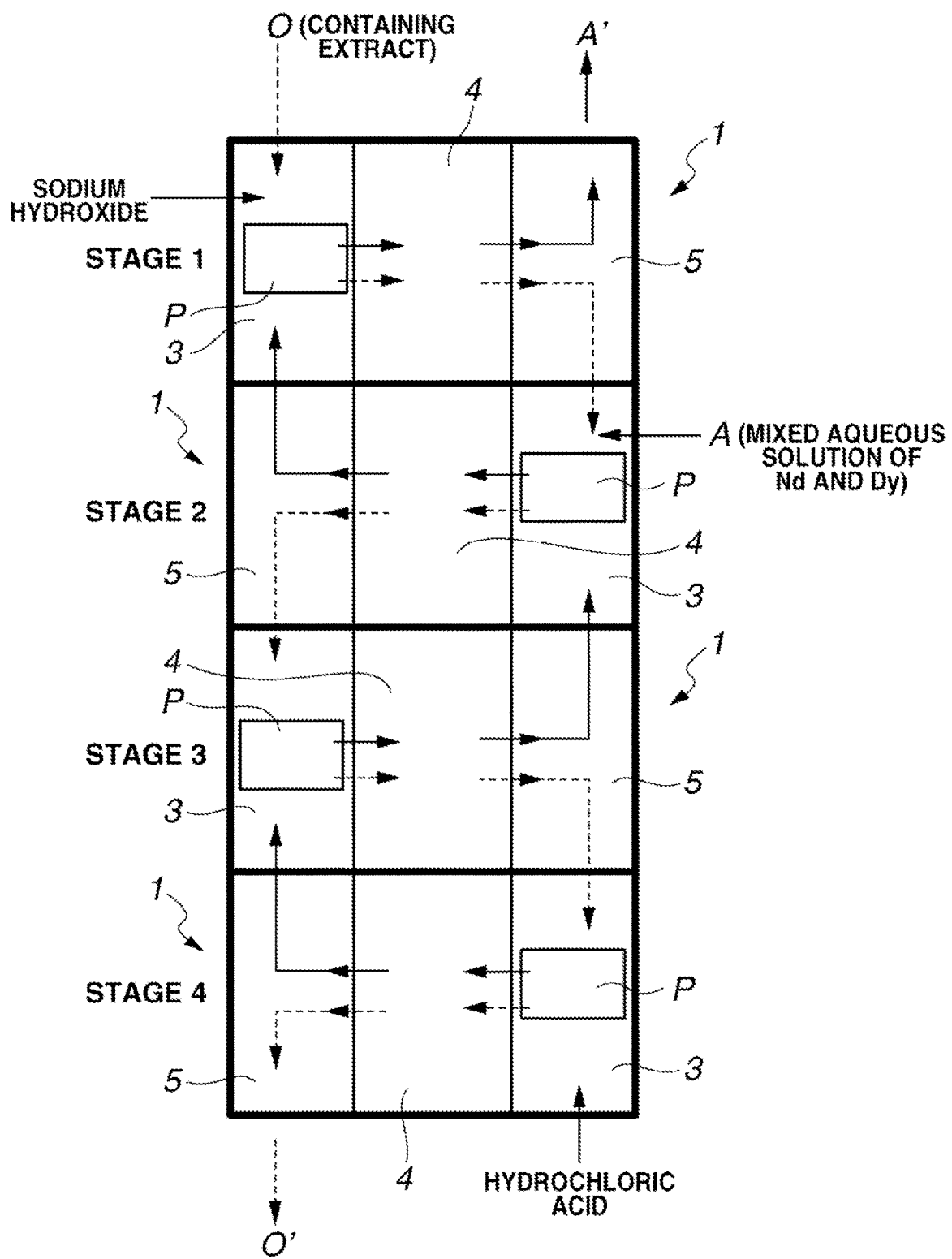
FIG. 2 schematically illustrates an example of a multistage liquid-liquid extraction apparatus in which liquid-liquid extraction units of the invention are connected together in four stages.

The objects, features and advantages of the invention will become more apparent from the following detailed description taken in conjunction with the appended diagrams.

Figure 1:
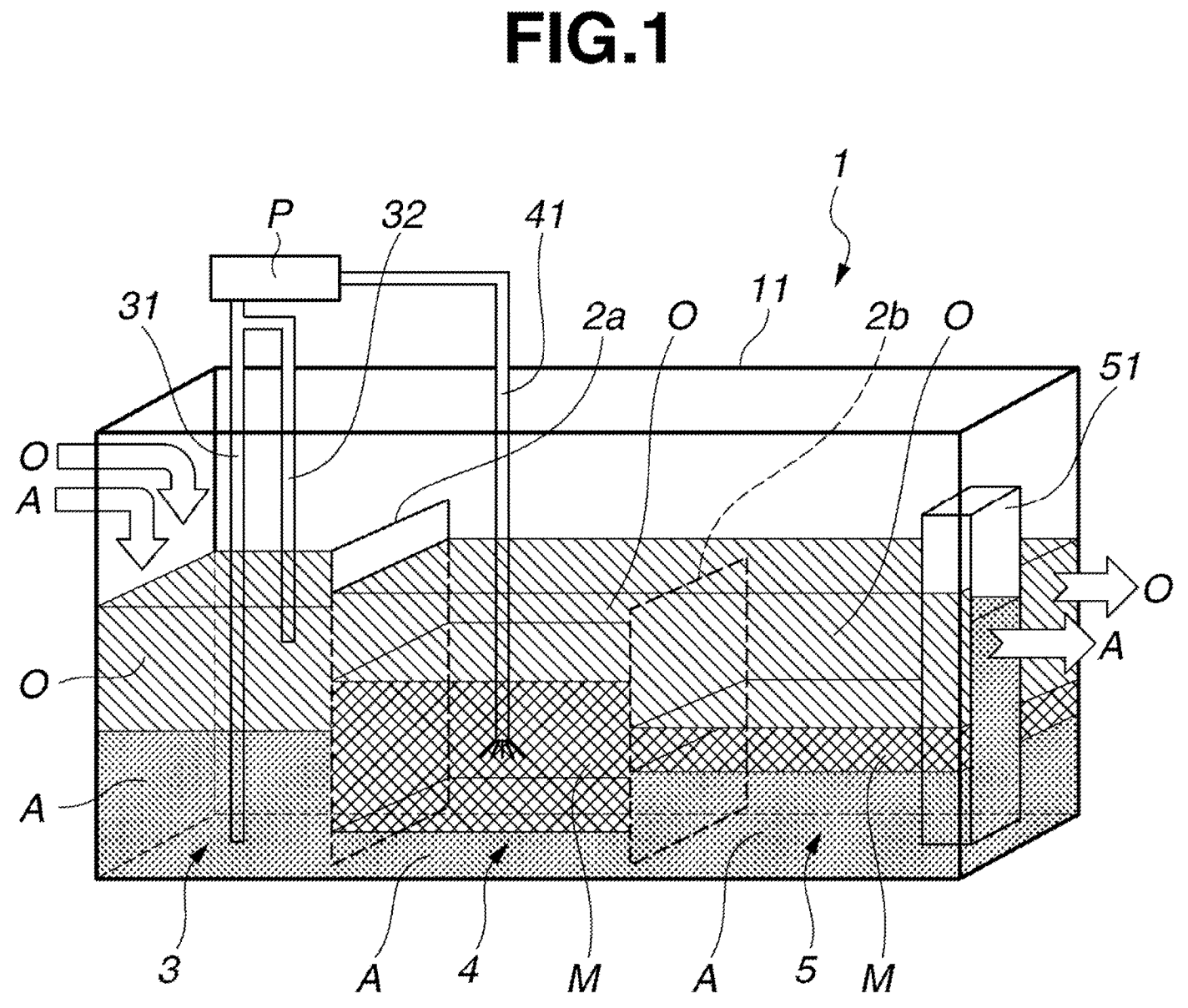

FIG. 1 shows a liquid-liquid extraction unit 1 according to one embodiment of the invention. The unit 1 has a main body 11 which is a rectangular parallelepiped vessel having a rectangular base and an open top. The main body 11 is horizontally divided at the interior by two partitions 2a and 2b into, from left to right in FIG. 1, three compartments: a feed compartment 3, a reaction compartment 4 and a standing compartment 5.

The feed compartment 3 is separated from the reaction compartment 4 by the first partition 2a. This first partition 2a has a top end that is set higher than the level of the liquid ("liquid" refers herein to the subsequently described aqueous phase A and organic phase O) that has been received in the feed compartment 3 so that the liquid within the feed compartment 3 does not pass over the top end of the first partition 2a and flow directly into the reaction compartment 4. The first partition 2a has a bottom end which abuts or is joined to a base of the unit main body 11 and which, as with the top end, may be configured so that liquid does not flow directly into the reaction compartment 4. However, bearing in mind the rate of liquid inflow, the first partition may be set so that somewhat of a gap is formed with the base or means for fluid communication may be provided by forming a notch or an opening in the bottom end of the first partition 2a. In this way, even when the feed compartment 3 has a large capacity, liquid overflow from the reaction compartment 4 can be prevented, enabling a balance to be achieved between the liquid volumes in the feed compartment 3 and the reaction compartment 4. Also, because the aqueous phase A and the organic phase O in the feed compartment 3 are constantly being drawn upward, mixed and sent to the reaction compartment 4 by the subsequently described mixing feeder (pump) P, the liquid level in the reaction compartment 4 is always set higher than the liquid level in the feed compartment 3, such that even if means for fluid communication is provided below or in a lower portion of the first partition 2*a*, liquid in the feed compartment 3 does not pass through this fluid communicating means and flow directly into the reaction compartment 4.

Although not shown in FIG. 1, an aqueous phase inlet for admitting the aqueous phase A and an organic phase inlet for admitting the organic phase O are typically provided on a sidewall at one horizontal end of the unit main body 11 (the left side in FIG. 1) serving as a sidewall of the feed compartment 3, such that the aqueous phase A and the organic phase O are continuously or intermittently admitted to and received in the feed compartment 3 from these aqueous and organic phase inlets. As shown in FIG. 1, the aqueous phase A and the organic phase O which have been admitted to and received in the feed compartment 3, owing to a difference in specific gravity therebetween, assume a separated state with the aqueous phase A on the bottom and the organic phase O on top.

The form of the aqueous phase inlet and the organic phase inlet is not particularly limited. For example, suitable aqueous phase inlet and organic phase inlet lines may be used to introduce the aqueous and organic phases from above the open main body 11 to the feed compartment 3. Alternatively, suitable inlet openings for introducing the aqueous and organic phases to the feed compartment 3 may be provided on one sidewall thereof (the wall at left in FIG. 1).

The reaction compartment 4 is separated from the feed compartment 3 by the first partition 2*a* and is separated from the standing compartment 5 by the second partition 2*b*. This second partition 2*b* is provided with a gap between a bottom end thereof and the base of the unit main body 11 through which liquid is allowed to circulate between the reaction compartment 4 and the standing compartment 5. Also, the height of the second partition 2*b* is set lower than the level of the received liquid, allowing the liquid to pass over the top end of the second partition 2*b* and circulate between the reaction compartment 4 and the standing compartment 5. In this way, liquid is able to circulate between the reaction compartment 4 and the standing compartment 5 both above and below the second partition 2*b*. Instead of providing a gap between the bottom end of the second partition 2*b* and the base of the unit main body 11, a notch or an opening may be formed at the bottom end of the second partition 2*b* as an alternative means for fluid communication that allows the liquid to circulate. Similarly, instead of the top end of the second partition 2*b* being set lower than the liquid level, the second partition 2*b* may have an opening formed in an upper portion thereof for fluid communication between the reaction compartment 4 and the standing compartment 5.

The aqueous phase A and the organic phase O are transferred in a mixed state by the subsequently described pump (mixing feeder) P to this reaction compartment 4 from the feed compartment 3.

The standing compartment 5, as mentioned above, is separated from the reaction compartment 4 by the second partition 2*b* in such a way as to allow liquid circulation above and below the partition 2*b* and has at the interior thereof a tubular aqueous phase discharge passage 51 oriented upright along a sidewall of the unit main body 11 at the other horizontal end thereof (right sidewall in FIG. 1) serving as a sidewall of the standing compartment 5. This aqueous phase discharge passage 51 is open at both top and bottom ends and a gap is provided between the bottom end thereof and the base of the unit main body 11, allowing the aqueous phase A in the lower portion of the standing compartment 5 to flow into the aqueous phase discharge passage 51. The top end is set higher than the liquid level so that the organic phase O in the upper portion of the standing compartment 5 does not flow into the aqueous phase discharge passage 51.

Although not shown in the diagrams, an organic phase outlet for discharging organic phase O from the standing compartment 5 and an aqueous phase outlet for discharging aqueous phase A from the aqueous phase discharge passage 51 are provided in the upper portion of the standing compartment 5 on the sidewall of the unit main body 11 at the other horizontal end thereof (right sidewall in FIG. 1) serving as a sidewall of the standing compartment 5. The aqueous phase A and the organic phase O are discharged and recovered by passing through, respectively, an aqueous phase discharge line and an organic phase discharge line (not shown) connected to these respective outlets.

The aqueous phase discharge passage 51 here is not always an essential feature. For example, an aqueous phase outlet may be provided on a lower portion of the sidewall of the unit main body 11 at the other horizontal end thereof (right sidewall in FIG. 1) so as to discharge the aqueous phase A directly from the lower portion of the standing compartment 5. However, it is preferable to discharge and recover the aqueous phase A from the upper portion of the unit main body 11 through the aqueous phase discharge passage 51. The reason is that, although the phase-separated aqueous phase A exists at the lower portion of the standing compartment 5, providing the above-described aqueous phase discharge passage 51 enables the separated aqueous phase to be discharged from above the sidewall of the unit main body 11 without the entrainment of phase-separated organic phase O within the standing compartment 5. The aqueous phase A and the organic phase O can be discharged in this way from the unit by causing them to overflow, eliminating the need to use a drawing means such as a pump. This is highly advantageous in cases where, for example, a plurality of extraction units 1 are connected together to create the subsequently described multistage liquid-liquid extraction apparatus.

The liquid-liquid extraction unit of the invention is provided with mixing feeder for mixing the aqueous phase A and the organic phase O within the feed compartment 3 and conveying the mixture under pressure to the reaction compartment 4. In the example shown in FIG. 1, a single pump P is furnished as the mixing feeder. The pump P, although not particularly limited, is preferably a diaphragm pump.

An aqueous phase suction line 31 having a distal end disposed in the lower portion of the feed compartment 3 and an organic phase suction line 32 having a distal end disposed in the middle to upper portion of the feed compartment 3 are connected to this pump (mixing feeder) P, such that the aqueous phase A is drawn from the lower portion of the feed compartment 3 through the aqueous phase suction line 31, the organic phase O is drawn from the middle to upper portion of the feed compartment 3 through the organic phase suction line 32, and both phases are mixed together within the pump (mixing feeder) P. A mixture feed line 41 having a distal end disposed in the middle of the reaction compartment 4 is connected to this pump (mixing feeder) P, enabling the mixture M obtained by mixing of the aqueous phase A and the organic phase O by the pump (mixing feeder) P to be introduced to the reaction compartment 4 through this mixture feed line 41. The pump (mixing feeder) P, as described above, transfers the aqueous phase A and the organic phase O stored in the feed compartment 3 to the reaction compartment 4 through the aqueous phase suction line 31, the organic phase suction line 32 and the mixture feed line 41, and also serves as means for fluid transfer throughout the entire liquid-liquid extraction unit 1.

The positions at which the distal ends (suction ends) of the aqueous phase suction line 31 and organic phase suction line 32 are disposed may be adjusted as appropriate for the liquid levels of the aqueous phase A and the organic phase O that are admitted to the feed compartment 3; it is not always necessary to vertically divide the feed compartment 3 in the middle. The layout of the pump (mixing feeder) P, the aqueous phase suction line 31, the organic phase suction line 32 and the mixture feed line 41 may be suitably arranged so long as the aqueous phase A and the organic phase O stored in the feed compartment 3 can be conveyed to the reaction compartment 4 while being mixed.

It is desirable to provide a spray nozzle or a full cone nozzle at the distal end of the mixture feed line 41. A plurality of orifices are formed on the circumferential surface at the distal end of the spray nozzle or full cone nozzle. The mixture (emulsion) issuing from the spray nozzle or full cone nozzle is discharged into the reaction compartment 4 as an even finer emulsion, enabling the extractive reaction to be carried out more efficiently. The spray nozzle or full cone nozzle is not limited to a conical shape. For example, a trumpet-shaped nozzle may be used when the intention is to broadly discharge the mixture of aqueous phase A and organic phase O. The diameter of the plurality of orifices formed on the circumferential surface of the spray nozzle or full cone nozzle may be suitably selected without particular limitation, although the diameter is preferably between 30 μm and 20 mm, more preferably between 30 μm and 10 mm, and even more preferably between 100 μm and 6 mm. Within this range in diameter, the extractive reaction can be fully carried out while maintaining good phase separation of the aqueous phase A and the organic phase O.

Next, the operation of this liquid-liquid extraction unit 1 is described.

When the liquid-liquid extraction unit 1 is used to extract and separate rare-earth elements, for instance, a rare-earth element-containing aqueous phase A and an organic phase O to which an extractant has been added are introduced to the feed compartment 3 from, respectively, the aqueous phase inlet and the organic phase inlet. There is no particular need at this point to use a means for mixing together both phases A and O; rather, the two phases A and O are stored within the feed compartment 3 in a vertically phase-separated state owing to a difference in their specific gravities. The stored aqueous phase A and organic phase O are drawn to, typically, a pump P serving as the mixing feeder from, respectively, the aqueous phase suction line 31 and the organic phase suction line 32, and are agitated within the pump (mixing feeder) P, thereby forming an emulsion-state mixture M of the aqueous phase A and the organic phase O. This mixture M is then expelled into the reaction compartment 4 through the mixture feed line 41. The expelled emulsion-state mixture M gradually phase-separates in the reaction compartment 4, at which time the desired rare-earth element contained in the aqueous phase A is extracted to the organic phase O. The partially phase-separated aqueous phase A and organic phase O then move to the standing compartment 5 in fluid communication therewith above and below the second partition 2b, and fully phase-separate in the standing compartment 5. The fully phase-separated aqueous phase A and organic phase O are discharged from, respectively, the aqueous phase outlet and the organic phase outlet and recovered outside of the liquid-liquid extraction unit 1. In cases where a plurality of rare-earth elements are contained in the aqueous phase A and where some portion of the rare-earth elements cannot be extracted by the organic phase O, the unextracted rare-earth element is discharged from the aqueous phase outlet while remaining in the aqueous phase.

A multistage liquid-liquid extraction apparatus that carries out a multistage extraction operation can be constructed from a plurality of the liquid-liquid extraction units 1 of the invention by, as illustrated by the four-stage liquid-liquid extraction apparatus shown in FIG. 2, connecting the aqueous phase outlet of one unit to the aqueous phase inlet of another unit, connecting the organic phase outlet of the one unit to the aqueous phase inlet of the other unit, and similarly coupling together all of the units in this fashion. Moreover, as shown in the examples described below, when consecutively carrying out an extraction step that extracts a rare-earth element from an aqueous phase A into an organic phase O, a scrubbing step that scrubs the organic phase O and a back-extraction step that recovers the rare-earth element from the organic phase O, some or all of these extraction, scrubbing and back-extraction sections may be built as multistage liquid-liquid extraction apparatuses using the liquid-liquid extraction unit 1 of the invention.

As explained above, the liquid-liquid extraction unit of the invention makes it possible, without the use of an agitator as in prior-art extraction units, to agitate and mix together an aqueous phase A and an organic phase O with only, for example, a single pump (mixing feeder) P to rapidly form an emulsion, carry an extractive reaction and effect phase separation. Accordingly, solvent extraction can be carried out under easier operation and control than in the prior art, which has required close control of the liquid levels using separate pumps for feeding the aqueous phase A, feeding the organic phase O, discharging the aqueous phase A and discharging the organic phase O. Moreover, with the liquid-liquid extraction unit of the invention, phase separation is rapid and operation at a large flow rate comparable to that of prior-art mixer-settlers is possible while maintaining a good efficiency. At the same time, because the liquid-liquid extraction unit of the invention is much smaller than prior-art mixer-settlers, when used to build a multistage liquid-liquid extraction apparatus that extracts and separates a plurality of elements existing in admixture within an aqueous phase A or a multistage continuous extraction system arrived at by coupling together a plurality of such multistage liquid-liquid extraction apparatuses, the footprint occupied by the resulting equipment can be greatly reduced and the volume of liquid required for solvent extraction can be substantially decreased, contributing to significant cost reductions.

EXAMPLES

Experimental Examples are given below to more concretely illustrate the advantageous effects of the liquid-liquid extraction unit of the invention, although it should be noted that the invention and the extraction process used therein are not limited by the following Examples.

Experimental Example 1

A multistage liquid-liquid extraction apparatus (FIG. 2) was constructed by coupling together four liquid-liquid extraction units 1 like that shown in FIG. 1. The dimensions of the liquid-liquid extraction units 1 used were 120 mm (W)×200 mm (D)×200 mm (H). A first partition 2a measuring 2 mm×120 mm×140 mm (H) was positioned 60 mm from one end of the unit in the horizontal direction, and a second partition 2b measuring 2 mm×120 mm×120 mm (H)

was positioned 140 mm from the same end. The main body 11 of the unit was divided into three compartments: a feed compartment 3, a reaction compartment 4 and a standing compartment 5. The first partition 2a positioned between the feed compartment 3 and the reaction compartment 4 was disposed so as to form a 3 mm gap with the base of the unit, and the second partition 2b positioned between the reaction compartment 4 and the standing compartment 5 was disposed so as to form a 5 mm gap with the base. A spray nozzle having a plurality of 4 mm diameter orifices formed in a circumferential surface of a conical line closed at the distal end was mounted on a distal end of the mixture feed line 41.

Each liquid-liquid extraction unit 1 had, disposed between the feed compartment 3 and the reaction compartment 4, a mixing feeder P, an aqueous phase suction line 31, an organic phase suction line 32 and a mixture feed line 41 for mixing together the aqueous and organic phases stored in the feed compartment 3 and transporting them to the reaction compartment 4. One diaphragm pump was installed as the mixing feeder P in each liquid-liquid extraction unit 1 and served as the power source for fluid transport. Therefore, the aqueous phase A and organic phase O which flow into the feed compartment 3 in one liquid-liquid extraction unit from the prior-stage liquid-liquid extraction unit and the aqueous phase A and organic phase O which flow out from the standing compartment 5 of the same liquid-liquid extraction unit to the next-stage liquid-liquid extraction unit were transported between the respective liquid-liquid extraction units 1 by being made to overflow under the driving force of the diaphragm pump (mixing feeder) P in each liquid-liquid extraction unit 1.

In the multistage liquid-liquid extraction apparatus of FIG. 2 used in the experiment, a solution prepared by dissolving the extractant PC-88A (mono-2-ethylhexyl 2-ethylhexyl phosphate) in kerosine to a concentration of 1 mol/L was used as the organic phase O and 100 liters of a mixed aqueous solution of neodymium and dysprosium (molar ratio, Nd:Dy=9:1; concentration, Nd+Dy=0.1 mol/L) was prepared and used as the aqueous phase A.

The following were introduced into the feed compartment 3 of the first-stage to liquid-liquid extraction unit 1 in FIG. 2: 4 L/h of the above organic phase O and 0.3 L/h of 4 mol/L sodium hydroxide. Also, 36 L/h of the above aqueous phase A was introduced into the feed compartment 3 of the second-stage liquid-liquid extraction unit 1 and 0.02 L/h of 5.5 N hydrochloric acid was introduced into the feed compartment 3 of the fourth-stage liquid-liquid extraction unit 1. The rare-earth element concentrations of the aqueous phase A' recovered from the stage-one standing compartment 5 were measured with an ICP emission spectrophotometer (ICPS-7510, from Shimadzu Corporation). The organic phase O' recovered from the stage-four standing compartment 5 was back-extracted with 5.5 N hydrochloric acid, and the concentrations of the rare-earth elements contained in this aqueous hydrochloric acid solution were measured in the same way as for the aqueous phase. The total number of conveying means provided in this multistage liquid-liquid extraction apparatus is as follows: one mixing feeder P for each stage, a conveying means for introducing the aqueous phase to the stage-two feed compartment 3, a conveying means for introducing the organic phase to the stage-one feed compartment 3, a conveying means for introducing the aqueous sodium hydroxide solution to the stage-one feed compartment 3 and a conveying means for introducing the hydrochloric acid to the stage-four feed compartment 3, for a total of eight conveying means (pumps). This solvent extraction operation was conducted throughout in a 35° C. temperature environment.

After carrying out the above extraction/separation operation, the concentrations of the rare-earth elements contained in the recovered aqueous phase A' and in the aqueous hydrochloric acid solution obtained by back-extracting the organic phase O' were measured as described above. The Dy concentration in the aqueous hydrochloric acid solution obtained by back-extracting the organic phase O' was 0.4 mol/L, and the Dy purity (Dy/(Nd+Dy)) was 98.7%. The Nd concentration in the aqueous phase A' was 0.1 mon, and the Nd purity (Nd/(Nd+Dy)) was 98.4%.

Experimental Example 2

In a multistage liquid-liquid extraction apparatus like that in Experimental Example 1, the diameter of the orifices in the spray nozzle mounted on the mixture feed line 14 in each liquid-liquid extraction unit 1 was variously set to 30 μm, 100 μm, 1 mm, 10 mm and 20 mm, an extraction/separation operation was similarly caned out, and the Dy and Nd concentrations were measured in the same way. The results are presented in Table 1. It is apparent from Table 1 that at spray nozzle orifice diameters of 30 μm, 100 μm, 1 mm and 10 mm, good Nd and Dy purities of more than 98% were obtained in the same way as in Example 1. However, when the orifice diameter was 20 mm, the Nd purity was 87% and the Dy purity was 90%; although good, these were somewhat lower purities.

TABLE 1

| | Spray nozzle | | | | |
|---|---|---|---|---|---|
| | 1 | 2 | 3 | 4 | 5 |
| Spray nozzle orifice diameter | 30 μm | 100 μm | 1 mm | 10 mm | 20 mm |
| Nd purity (%) | 98.6% | 98.6% | 98.5% | 98.2% | 87.0% |
| Dy purity (%) | 98.6% | 98.7% | 98.6% | 98.1% | 90.0% |

Comparative Example 1

Figure 3:
FIG. 3 is a schematic, perspective view of the prior-art mixer-settler used in Comparative Experimental Example 1.

A multistage liquid-liquid extraction apparatus made up of four stages was constructed using conventional mixer-settlers like that shown in FIG. 3 which do not employ the mixing feeder P and the aqueous phase suction line 31, organic phase suction line 32 and mixture feed line 41 used in above Experimental Examples 1 and 2, and which have a mixer chamber with an agitator disposed therein and a settler chamber divided into four compartments. This multistage liquid-liquid extraction apparatus was used to carry out an extraction/separation operation in the same way as in Example 1. A single agitator was disposed in the mixer-settler used in each stage. The aqueous phase was introduced from the stage-two mixer chamber, the organic phase was introduced from the stage-one mixer chamber, the aqueous sodium hydroxide solution was introduced from the stage-one mixer chamber, and the hydrochloric acid was introduced from the stage-four mixer chamber. A total of four conveying means for introducing, respectively, the aqueous phase, the organic phase, the aqueous sodium hydroxide solution and the hydrochloric acid were provided. In addition, a 5 mm gap with the base of the apparatus was formed in the lower portion of partitions provided between the mixer chamber and the settler chamber and within the settler chamber. Aside from the above, the dimensions and other aspects of the arrangement were the same as in Experimental Example 1.

In this multistage liquid-liquid extraction apparatus which uses conventional mixer-settlers, because the equipment dimensions are small, separation of the aqueous and organic phases that were mixed by the agitator was unable to keep up and a large volume of emulsion was generated within the system. As a result, the experiment was halted.

As demonstrated above, by using the liquid-liquid extraction unit of this invention, the system can be downsized and the footprint greatly decreased while maintaining a sufficient extraction efficiency. Moreover, external mechanical forces such as with an agitator are not applied, and so energy consumption can be reduced. Hence, the costs associated with the extraction/separation of rare-earth elements can be significantly curtailed.

Japanese Patent Application No. 2021-049326 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A liquid-liquid extraction unit configured to contact an aqueous phase with an organic phase, separate the contacted phases and recover a desired extract from the separated aqueous phase and/or the organic phase, comprising
    a feed compartment configured to receive the aqueous phase and the organic phase,
    a reaction compartment divided from the feed compartment by a partition configured to receive a mixture of the aqueous phase and the organic phase and subject the aqueous phase and the organic phase to an extractive reaction,
    a standing compartment in fluid communication with the reaction compartment configured to separate the mixture that flows in from the reaction compartment into the aqueous phase and the organic phase,
    a mixing feeder configured to draw the aqueous phase and the organic phase from the feed compartment, mix together the aqueous phase and the organic phase, and convey the mixture under pressure to the reaction compartment, an aqueous phase suction line having a distal end disposed in a lower portion of the feed compartment and a proximal end connected to the mixing feeder configured to draw the aqueous phase from the lower portion of the feed compartment to the mixing feeder,
an organic phase suction line having a distal end disposed in an upper portion of the feed compartment above the distal end of the aqueous phase suction line and a proximal end connected to the mixing feeder configured to draw the organic phase from the upper portion of the feed compartment to the mixing feeder,
a mixture feeding line having a distal end disposed within the reaction compartment and a proximal end connected to the mixing feeder configured to feed the mixture delivered from the mixing feeder to the reaction compartment; and
    wherein the feed compartment and the reaction compartment are separated by the partition, the partition having means disposed below or in a lower portion thereof configured to provide fluid communication between the feed compartment and the reaction compartment, the mixing feeder consists of a single pump configured as an only power source for fluid transport of the aqueous phase, the organic phase and the mixture of the aqueous phase and the organic phase, and there are no other pumps in the unit other than the single pump of the mixing feeder.

2. The unit of claim 1, further comprising a spray nozzle or a full cone nozzle attached to the distal end of the mixture feeding line disposed in the reaction compartment for delivering the mixture in a fine droplet state.

3. The unit of claim 2, wherein the spray nozzle or full cone nozzle has an orifice diameter of between 30 μm and 10 mm.

4. The unit of claim 1, wherein the reaction compartment and the standing compartment are separated by a second partition having means disposed above or in an upper portion thereof and below or in a lower portion thereof configured to provide fluid communication between the reaction compartment and the standing compartment.

5. The unit of claim 1, wherein dimensions of the liquid-liquid extraction unit are about 120 mm (W)×200 mm (D)×200 mm (H).

* * * * *